United States Patent [19]

Ogawa

[11] 3,745,702
[45] July 17, 1973

[54] FLOWER HOLDING BASE FOR FLOWER ARRANGEMENT

[76] Inventor: Kohei Ogawa, 220-7, Miwa-machi, Machida-shi, Tokyo, Japan

[22] Filed: Oct. 13, 1971

[21] Appl. No.: 188,975

[52] U.S. Cl.................. 47/41.13, D35/3 R, 211/60
[51] Int. Cl.............................................. A47g 7/07
[58] Field of Search....................... 47/41.13; 211/60

[56] References Cited
UNITED STATES PATENTS

| D48,239 | 12/1915 | Booth................................ D35/3 R |
| 485,417 | 11/1892 | Lord.................................. 47/41.11 |
| 2,691,849 | 10/1954 | Ehlers............................... 47/41.11 |
| 3,456,806 | 7/1969 | Borston.............................. 211/60 |
| 2,747,333 | 5/1956 | Erbguth............................. 47/41.13 |
| D145,868 | 11/1946 | Fletcher........................... 47/41.13 X |

FOREIGN PATENTS OR APPLICATIONS

| 21,034 | 1907 | Great Britain |
| 23,774 | 1898 | Great Britain.................... 47/41.13 |
| 845,789 | 9/1939 | France............................. 47/41.13 |

Primary Examiner—Robert E. Bagwill
Attorney—Berman, Davidson & Berman

[57] ABSTRACT

A flower holding base for flower arrangement provided with a plurality of flower inserting cylinders having different diameters and upper ends of which are opened and being disposed in a predetermined pattern and cylinders are slightly different from each other with respect to direction thereof.

2 Claims, 3 Drawing Figures

FLOWER HOLDING BASE FOR FLOWER ARRANGEMENT

BACKGROUND OF THE INVENTION

The present invention relates to flower holding bases for flower arrangement. In Japan, an art based on a long tradition which is called a flower arrangement has been well known from ancient times. This flower arrangement is a graceful art of enjoying the beautiful effect of numerous flowers arranged in a vase, and it has been introduced to western countries in recent years.

In order to arrange flowers, a device for positively securing the flowers so they will not fall is required inside of the vase, and the present invention relates to device for securing the flowers so they will not fall down.

OBJECT OF THE INVENTION

The conventional flower holding base for a flower arrangement is constructed in such a way that pins are thickly studded on the upper surface of the base and the stalks of the flowers to be arranged are inserted on the pins so as to be secured.

However, although the conventional flower holding base has the merit of arranging the flowers by employing free creative ideas it is difficult to learn satisfactory manners of flower arrangement unless a person who desires to learn spends a long period of time taking lessons under the guidance of a competent master. Furthermore, it is frequently necessary to arrange a large number of similar flowers at the same time, which is difficult to do by the conventional method.

An object of the present invention is to permit a person to obtain a flower pattern of excellently arranged flowers in a short time, and yet without suffering troubles after determining an original pattern of flower arrangement suitable for a flower holding base for flower arrangement when the flower holding base according to the present invention is used.

DESCRIPTION OF PREFERRED EMBODIMENTS

Figure 1:
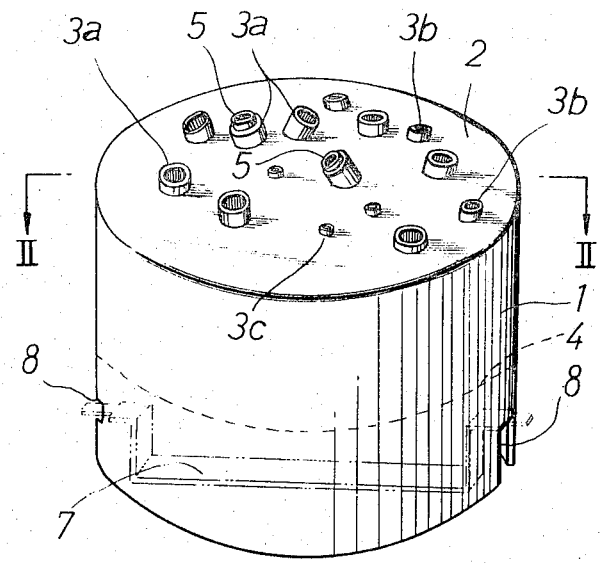
FIG. 1 is a perspective view when viewed from the side of the flower holding base of the present invention.
Figure 2:
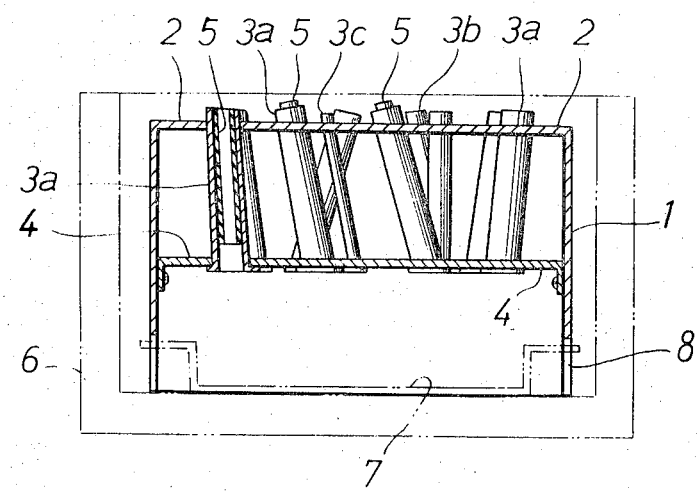
FIG. 2 is a side cross sectional view of the present invention.

Preferred embodiments of the present invention will be described by referring to the accompanied drawings in which reference numeral 1 is a flower holding base proper of short cylindrical shape the bottom surface of which is opened, and has an upper portion flat surface 2 which merges with peripheral portions of its frame portion. This flower holding base proper 1 may be made of metallic material or durable plastic materials which is not apt to rust even if it is soaked with water.

On the flat surface 2 of the upper portion of the flower holding base proper 1, a plurality of flower inserting cylinders 3a, 3b, 3c of different diameters are arranged in a predetermined pattern, each of which has a slightly different direction from the next. and the peripheral frame portions of larger parts of these inserting cylinders are housed inside of the flower holding base proper 1, and their upper end opening portions alone slightly protrude from the flat surface 2 of the upper portion of the base 1.

The lower ends of the cylinders 3a, 3b, 3c extend downwardly in the inside of the flower holding base proper 1, and penetrate a middle bottom plate 4 of the peripheral frame portion of the flower holding base proper 1 and are secured by the middle bottom plate, and water is arranged to enter through the lower ends of the cylinders.

Reference numeral 5 denotes a pliable vinyl tube which is inserted and secured in the inside of a cylinder and its upper surface opens similarly to the cylinder, and a stalk of a flower inserted in the tube 5 is adapted so as not to be easily resiliently pulled off.

Reference numeral 6 is a vase whose upper surface is opened, and a fixture plate 7 of narrow width is fixed to the bottom surface of the inside of the vase, and shaped notched portions are formed at the lower end of the peripheral frame portion of the flower holding base proper 1 which is mounted on the fixture plate 7 and lockingly engaged therewith to fix the flower holding base proper so as not to fall down.

Figure 3:
FIG. 3 is a descriptive view in which the present invention is employed.

The present invention has the foregoing construction and the method of its use is illustrated in FIG. 3.

First, the lower end of a bamboo branch 8' is inserted and secured in a cylinder 3a of relatively large diameter located on the flower holding base proper 1.

Next, the lower end of the stalk of a rose flower 9 is inserted and secured in a cylinder 3b having a diameter different from that of the cylinder 3a.

A small branch 10 of a pine tree is inserted and secured in a cylinder 3c of a small diameter and thus the flower arrangement is completed.

As described in the foregoing, a plurality of flower inserting cylinders 3a, 3b, 3c are arranged according to a predetermined pattern so as to be able to provide a desired flower arrangement, and yet the cylinders are disposed on the flower holding base proper with slightly variable angles, and therefore, a refined and beautiful flower arrangement can be completed in a short time by the mere insertion of designated flowers in the cylinders.

In the present invention, characters such as bamboo, rose, pine and the like may be displayed on the flat surface 2 corresponding to the cylinders 3a, 3b, 3c as indicia of appropriate flower insertions.

As explained above, according to the present invention, a plurality of flower holders having different patterns are prepared and they are detachably secured on the fixture plate (7) so as to provide many arranged flowers rich in variety, and yet as the stalk of the flower is positively secured in the cylinder, the flowers can be displayed with the position, length and inclination of the flower in fixed condition for a long period of time and also anyone can obtain a large number of similar type flower arrangement in a short time.

Although the invention is described with reference to a preferred embodiment, it will be appreciated by those skilled in the art that additions, deletions, modifications and substitutions and other changes not specifically described in this embodiment may be made which will fall within the purview of the appended claims.

What is claimed is:

1. A flower holding base comprising a hollow vessel having a horizontal top wall and a peripheral wall depending from said top wall, a horizontal intermediate flat plate secured inside said peripheral wall a substantial height above the bottom edge of said peripheral wall and spaced below said top wall, and a plurality of flower-supporting cylindrical tubular members secured to and extending through said top wall and intermediate plate and projecting above said top wall, said tubular members being inclined in different directions so as to define a predetermined flower pattern and having different respective diameters to receive different sizes of plant stalks.

2. The flower holding base of claim 1, and wherein the cylindrical tubular members are provided with soft pliable synthetic resin lining tubes, whereby to define yieldable clamping means for the stems of flowers inserted therein.

* * * * *